United States Patent Office 2,957,833
Patented Oct. 25, 1960

2,957,833
METHOD OF MAKING A MOLDABLE COMPOSITION FROM STYRENE AND A STYRENE-RUBBER INTERPOLYMER

Sidney J. Baum, Fitchburg, Mass., assignor to Foster Grant Co., Inc., Leominster, Mass., a corporation of Delaware No Drawing. Filed Mar. 31, 1958, Ser. No. 724,862

1 Claim. (Cl. 260—4)

This invention relates to improved resinous compositions. More particularly, it relates to styrene-rubber compositions having improved physical properties.

Polystyrene is widely used as a molding composition and is noted for the clarity of its products. However, for many purposes, polystyrene is unsatisfactory because of its low impact resistance, flexibility and elongation. Where such properties have been improved, such as by blending preformed polystyrene with a rubbery material, the resultant products have been characterized by such undesirable properties as opacity, poor heat and light stability, and poor resistance to oxygen. Physical admixture of a rubbery material with preformed polystyrene usually requires a relatively high concentration of the rubbery material to give even medium impact strength properties. The rubber is difficult to mix with polystyrene with the result that an undesirable laminar structure develops which makes molding and extrusion difficult. Conventional plastics working machinery is inadequate to provide a sufficiently finely dispersed mixture. Polymerization of a single mass of styrene in the presence of a rubbery material tends to improve impact resistance and yield a more homogeneous product than blending, but nevertheless results in opaque products.

I have unexpectedly found that styrene resin compositions of improved clarity can be obtained by polymerization of styrene in the presence of a rubbery material wherein the styrene monomer is added and polymerized in incremental stages until the ultimately desired styrene-rubber ratio is obtained. Thus, styrene monomer can be added gradually to a mass of pure rubber under polymerizing conditions until the desired styrene-rubber ratio is obtained, or can be added in a number of finite increments. In particular, I have found that, if I first react 20–80 parts by weight of a rubbery material with 80–20 parts by weight of styrene monomer to form an interpolymer and then react the interpolymer with one or more additional increments of styrene monomer in separate polymerization stages that the resultant products are improved in flexibility and have excellent clarity. The most outstanding improvement in flexibility and clarity results from forming the initial interpolymer from substantially equal parts by weight of the rubbery material and styrene, followed by the subsequent addition and polymerization of additional styrene in one or more stages.

The products of this invention having the most useful combination of flexibility, impact resistance, clarity and ease of molding and extrusion are those which have a total rubbery content of between 1% and 20% by weight.

Rubbery materials which may be employed in this invention consist of natural rubber, polychloroprene, and synthetic unsaturated rubbery polymeric derivatives of a conjugated 4–6 carbon atom diolefin, as for example, rubbery copolymers of butadiene-styrene, butadiene-acrylonitrile, styrene-isoprene, acrylonitrile-isoprene, and styrene-2,3-dimethylbutadiene, polybutadiene, and polyisoprene.

Catalysts that may be used are the free radical polymerization catalysts commonly used in ordinary styrene polymerizations. Examples of these include benzoyl peroxide, tertiary butyl perbenzoate and lauroyl peroxide. Minimum concentration of catalysts are preferred in this invention. The products of highest clarity are obtained when the styrene polymerizes thermally in the presence of rubber in the absence of catalyst. However, since some styrene monomers and some rubbers contain traces of inhibitors which interfere with thermal polymerization, small quantities of catalysts are incorporated in the formulation to overcome the effect of these inhibitors.

In addition to the required ingredients of this invention as stated above, it is often desirable to incorporate small quanties of compounding ingredients, such as antioxidant, and plasticizer. Up to 2% by weight based on the finished compound may be used of an antioxidant to prevent possible degradation of the rubbery material. Examples of such antioxidants include 2,6-tert-butyl-4-methyl phenol and alkylated aryl phosphites. A plasticizer in an amount up to about 5% by weight, as for example, butyl stearate, may be similarly used to impart desirable flow and molding properties to the finished compound.

It is necessary in carrying out this invention that the ingredients be well dispersed with one another. Thus, the entire operation can be carried out in a Banbury or similar mixer. In this case the rubber is charged into the mixer with the selected quantity of initial monomer and the mixer set in motion until the ingredients are dispersed. The mixer is then heated to effect polymerization. Additional charges of styrene monomer are then added, dispersed and heated. A total of three or four total additions of monomer is usually sufficient to provide a clear, highly impact-resistant product. Incremental addition of monomers may be effected by gradual as well as intermittent addition. Gradual addition is preferably done at approximately the same rate at which the styrene is being polymerized.

Instead of one Banbury mixer, a series of mixers can be used wherein the charge of rubber and the initial portion of monomer is dispersed and polymerized in the first mixer and the product added to the second mixer with a selected second quantity of monomer for dispersion and polymerization. The polymerized product from the second mixer can, where desired, be cascaded to another mixer where additional monomer is added, dispersed and polymerized. Instead of a batch mixer, an extruder can be used where it is designed for addition of monomer ingredients at intervals along the extruder barrel. Such extruder is preferably designed for different temperature zones along the barrel length. In the first zone the temperature is maintained to effect polymerization of the rubber-monomer feed. The product moves into a second zone where additional monomer is continuously added by means of a port in the extruder barrel and the process continued along the extruder barrel with additional ports and additional monomer as desired. The temperature and travel time in each zone are adjusted to effect complete polymerization of the material prior to its entry into the next zone.

Other apparatus which can be used includes a vertical tower equipped with an axial agitating device extending the length of the tower. In this case, the tower can be jacketed for different temperature zones and the monomer-rubber fed from the top with ports to add additional monomer at other positions in the tower.

Instead of using continuously mixing or agitating devices, the initial rubber-monomer charge can be intimately mixed first and then placed in a closed heated vessel such as a cylindrical container or pipe to form the interpolymer. The resultant product is then removed and intimately mixed with additional batch of monomer before the next polymerization, and so on.

Normal polymerization conditions may be employed in the practice of this invention. Thus, as is often preferred, each polymerization stage can be carried out under a blanket of nitrogen. The times and temperatures of polymerization may vary and are governed by the properties desired in the finished material. Thus, for example, each batch of monomer may be polymerized at one particular temperature or may be polymerized in various selected temperature stages. In general, since the polymerization is exothermic, the rate of polymerization is governed by the rate of heat and polymer can be removed from the polymerizing mass so that the nature and design of the equipment used as well as desired finished properties influences the time-temperature conditions of a polymerization stage.

A number of illustrative examples of this invention are given below.

*Example I*

A. 50 parts by weight of a rubbery copolymer of butadiene-styrene (GR–S), 50 parts by weight of styrene, 10 parts by weight of butyl stearate, and 3.3 parts by weight of 2,6 tert-butyl-4 methyl phenol were dispersed in a Banbury mixer at room temperature until a homogeneous mixture was formed. With the mixer in motion, the polymerization was carried to completion by heating for twenty-four hours at 100° C. followed by sixteen hours at 150° C.

B. 180 parts by weight of the product from part A (interpolymer) were mixed with 1320 parts of styrene at room temperature. 0.2 part of benzoyl peroxide and 0.4 part dodecyl mercaptan were added and the mixture heated at 87° C. for 3½ hours followed by 5 hours at 100° C. At this point 0.2 part benzoyl peroxide dissolved in 20 parts styrene monomer was added to the mixture and polymerization continued at 100° C. for an additional 2½ hours. The polymerization was then completed by removing the mixture from the mixer and polymerizing in cylindrical containers for an additional 14 hours at 100° C. followed by 15 hours at 150° C.

The resultant product was more flexible than ordinary polystyrene, and exhibited an Izod impact strength of .47. It exhibited a percent light transparency of 15%–20% at 400–700 millimicrons light for molded tiles 0.060 inch thick as compared with 3%–12% for a similar run where all the monomer and rubber were mixed together before beginning polymerization. Where a 0.020 inch thick plate was made from the product of Example I and compared with commercially available "high impact" polystyrene as well as samples made from material in which all the monomer and rubber were mixed at the beginning of polymerization, news print was visible for a distance of over 12 inches with the product made in accordance with Example I whereas visibility extended to only ¼ of an inch distance for all the other samples.

*Example II*

A. A mixture consisting of 50 parts GR–S, 50 parts styrene, 13.3 parts butyl stearate and 3.3 parts 2,6 tert-butyl-4 methyl phenol was polymerized as in Part A of Example I.

B. 100 parts of the above A product (interpolymer) were thoroughly mixed in the Banbury at room temperature with 0.2 part of benzoyl peroxide, 200 parts of styrene and .05 part dodecyl mercaptan. With mixing continuing, the mass was heated to 100° C. and maintained at that temperature for 24 hours, then heated to 150° C. and so maintained for 16 hours to form the second stage polymer. The mixer was then cooled. 0.01 part of benzoyl peroxide dissolved in 100 parts of styrene were then added to 100 parts of the second stage polymer and mixed until dispersed. This mixture was then polymerized, under continuous agitation, for 24 hours at 100° C. then 16 hours at 150° C. The resultant compound contained 90.5% styrene, 7.1% rubber, 1.9% butyl stearate and 0.5% 2,6 tert-butyl-4 methyl phenol. Discs pressed from this compound had good flexibility and improved clarity over commercially available impact-resistant polystyrene.

C. 200 parts of the A product (interpolymer) were masticated for 30 minutes at room temperature. Then 400 parts of styrene monomer containing 0.4 part benzoyl peroxide were added and the mixing continued until the solution was uniform. With mixing continuing, the mass was reacted for 24 hours at 100° C. and then 16 hours at 150° C. 300 parts of this reaction product were then mixed with 288 parts of styrene monomer containing 0.29 part of benzoyl peroxide for 90 minutes. The mass was then reacted for 24 hours at 100° C and 16 hours at 150° C. The resultant compound contained 90.3% styrene, 7.3% rubber, 1.9% butyl stearate and 0.5% 2,6 tert-butyl-4 methyl phenol. Discs molded therefrom showed improved flexibility and clarity over commercial "high impact" polystyrene.

*Example III*

A. A mixture consisting of 30 parts GR–S, 50 parts styrene, 10 parts butyl stearate, and 2.5 parts 2,6 tert-butyl-4 methyl phenol was polymerized as in Part A of Example I.

B. 100 parts of the above A product (interpolymer) were then treated as in part B of Example II. The resultant product contained 92.2% styrene, 5.4% rubber, 1.9% butyl stearate and 0.45% 2,6 tert-butyl-4 methyl phenol. Discs pressed from this compound had good flexibility and improved clarity over commercially available impact-resistant polystyrene, though of slightly lower impact resistance than Examples I, II(B), or II(C).

I claim:

A method for preparing a moldable composition which consists in adding styrene and a free radical polymerization catalyst to a preformed interpolymer of 20% to 80% by weight of a monomeric material consisting of styrene and correspondingly 80 to 20% by weight of a rubbery material, uniformly dispersing said preformed interpolymer in said added styrene and mass polymerizing said styrene in said so-formed dispersion, the amount of styrene added being such that the end product has a total rubbery material content of from 1% to 20% by weight, said rubbery material being selected from the group consisting of natural rubber, polychloroprene, and synthetic rubbery polymers of a conjugated diolefin containing 4–6 carbon atoms.

References Cited in the file of this patent

UNITED STATES PATENTS

| | | |
|---|---|---|
| 2,317,859 | Soday | Apr. 27, 1943 |
| 2,460,300 | LeFevre et al. | Feb. 1, 1949 |
| 2,745,818 | TeGrotenhuis | May 15, 1956 |
| 2,754,282 | Stoops et al. | July 10, 1956 |
| 2,755,270 | Hayes | July 17, 1956 |

FOREIGN PATENTS

| | | |
|---|---|---|
| 749,494 | Great Britain | May 23, 1956 |
| 766,585 | Great Britain | Jan. 23, 1957 |
| 778,102 | Great Britain | July 3, 1957 |